United States Patent [19]

Flynn

[11] Patent Number: 4,563,341

[45] Date of Patent: * Jan. 7, 1986

[54] METHOD AND MEANS FOR CONVERTING GRAPHITE TO DIAMOND

[76] Inventor: Hugh G. Flynn, 55 Council Rock Ave., Rochester, N.Y. 14610

[*] Notice: The portion of the term of this patent subsequent to Jun. 8, 1999 has been disclaimed.

[21] Appl. No.: 385,816

[22] Filed: Jun. 7, 1982

Related U.S. Application Data

[63] Continuation-in-part of Ser. No. 907,737, May 19, 1978, Pat. No. 4,333,796.

[51] Int. Cl.⁴ .......................... C01B 35/10; B01J 3/06
[52] U.S. Cl. .................... 423/278; 423/446; 423/561 B; 423/DIG. 11; 376/100
[58] Field of Search ............... 376/100, 149; 423/446, 423/561 B, 278, DIG. 11

[56] References Cited

U.S. PATENT DOCUMENTS

| | | | |
|---|---|---|---|
| 3,346,458 | 10/1967 | Schmidt | 376/149 |
| 3,652,220 | 3/1972 | Lindstrom et al. | 423/446 |
| 4,034,066 | 7/1977 | Strong et al. | 423/446 |
| 4,113,846 | 9/1978 | Sigurdsson | 423/446 |
| 4,275,050 | 6/1981 | French et al. | 423/446 |
| 4,287,168 | 9/1981 | Wentorf, Jr. et al. | 423/446 |
| 4,333,796 | 6/1982 | Flynn | 376/100 |
| 4,340,576 | 7/1982 | Strong | 423/446 |
| 4,352,787 | 10/1982 | French et al. | 423/446 |
| 4,425,315 | 1/1984 | Tsuji et al. | 423/446 |

Primary Examiner—Salvatore Cangialosi
Attorney, Agent, or Firm—Shlesinger, Fitzsimmons & Shlesinger

[57] ABSTRACT

A host liquid, such as a liquid metal, which is "seeded" with small bubbles of an inert gas, is maintained in a sealed chamber at an ambient temperature of about 100° K. above the melting point of the host liquid, and at a static pressure ranging from 1 to 100 bars. A substance (for example carbon) which is capable of being allotropically transformed from a first form thereof (for example graphite) to a second form (for example diamond), is placed in the host liquid, which is then subjected to a time-varying acoustical pressure applied, for example, by a plurality of solid acoustical horns, which cause at least certain of the bubbles of inert gas to expand and then suddenly to collapse in a cavitation zone located substantially centrally of the chamber. By maintaining the host liquid at a pressure and temperature sufficient to cause the Hugonoit curve of the liquid to intersect a predetermined area of the phase diagram of the substance, the shock waves produced by the collapsing bubbles can be caused to envelop particles of graphite and to instantaneously transform them into diamond particles. The host liquid can be selected from a group consisting of aluminum, tin, gallium, thallium and indium, and alloys thereof; and the substance to be transformed may be selected from the group consisting of carbon, boron nitride and zinc sulphide.

37 Claims, 2 Drawing Figures

METHOD AND MEANS FOR CONVERTING GRAPHITE TO DIAMOND

RELATED APPLICATION

This application is a continuation-in-part of my co-pending U.S. patent application Ser. No. 907,737, filed May 19, 1978, now U.S. Pat. No. 4,333,796 granted June 8, 1982.

BACKGROUND OF THE INVENTION

This application relates to a novel method and means for effecting allotropic changes in various elements and compounds, and more particularly to the use of acoustical energy to effect the cavitation of a liquid metal that is seeded with graphite particles, thereby to convert the graphite to diamond.

An allotropic change is one in which the structure of a solid is transformed from one stable form to another without any chemical change. A specific allotropic transformation that this invention is designed to bring about is that of graphite to diamond. Other substances that can be induced to undergo useful allotropic changes by this invention are boron nitride (BN) and zinc sulphide (ZnS). For a given material, the structure that is being transformed will be called Form I, and the new structure will be called Form II. Thus carbon has graphite as Form I, and diamond as Form II.

The basic principal of this invention is best understood within the context of cavitation dynamics, a technical field that deals with the motions of cavitation bubbles generated in a "host" liquid by an acoustical pressure. The relevant concepts and nomenclature are set forth in two papers by the applicant (H. G. Flynn, J. Acoust. Soc. Am. Vol. 57, pp. 1379-1396, and J. Acoust. Soc. Vol. 58, pp. 1160-1170, each 1975) as well as in applicant's above-noted patent application Ser. No. 907,737. In this nomenclature the word cavity is used to distinguish cavitation bubbles from passive spheres of gas and vapor found, for example, in carbonated liquids.

When subjected to a reduction of pressure of an appropriate duration and magnitude, small pre-existing bubbles of gas and vapor in a liquid of the type described herein expand to some maximum size and then collapse with a great violence. An intense, shock wave is radiated by the collapsed cavity. This phenomenon is called cavitation, and when properly controlled it may result in an implosion of a bubble that causes very high energy densities both within the bubble and in the surrounding liquid. In the case of a specific embodiment of this invention, these high energy densities are used to convert graphite or carbon particles to diamond.

The transition from graphite to diamond by shock waves has been reported by De Carli and Jameson (Science Vol. 113, p. 1821, 1961) and by Adler and Christian (Physical Review Letters, Vol. 7, p. 367, 1961). Bundy (J. Chem. Phys. Vol. 38, p. 631, 1963) identified a region in the pressure-temperature phase diagram for carbon (referred to hereinafter as the S-T region) where essentially spontaneous transitions from graphite to diamond occur. Data on the graphite-diamond transition have been summarized by Bundy, Strong and Wentorf (*The Chemistry and Physics of Carbon*, Vol. 10, Marcel Dekker, Inc., 1973). Shock-induced transformation of graphite to diamond has also been described in U.S. Pat. Nos. 3,328,018; 3,238,019; 3,348,918; 3,401,019; 3,608,014; 3,632,242; 3,659,072.

None of these publications, however, suggests the conversion of elements or compounds from Form I to Form II structures by an acoustical cavitation process of the type described hereinafter.

In what follows, the symbol $R_n$ denotes the initial or equilibrium radius of a bubble in centimeters, and the symbol R denotes the time-varying radius of a bubble with an initial radius $R_n$. Negative pressure means a reduction of the operating (static, ambient) pressure $p_L$ by an applied, time-dependent pressure field $p_A$ (known also as acoustic pressure), which may or may not make the total pressure less than zero. The operating (static, ambient) temperature is denoted by $T_L$. The small bubbles of inert gas from which cavitation starts are called seeds; the liquid in which cavitation occurs is called the host liquid; and a method of obtaining a distribution of seeds is called seeding the liquid. As noted hereinafter, seeding can be effected by exposing graphite particles to an inert gas before the particles are placed in the host liquid.

The cycle of expansion and contraction that a bubble undergoes under the influence of the applied pressure field $p_A$ is called a cavitation event, the term being restricted to the growth of a bubble from a seed and its subsequent collapse. The region in the host liquid where these events take place is called the cavitation zone. During the negative part of the cycle, a seed in the cavitation zone may grow into a bubble whose maximum radius $R_o$ may be many times greater than the initial radius $R_n$. The bubble then collapses to a minimum radius $R_m$. The ratio $R_o/R_n$ is called the expansion ratio and the ratio $R_m/R_o$ is called the compression ratio. Bubbles that pulsate about their equilibrium radii $R_n$ with maximum expansion ratios $R_o/R_n$ of less than 2 are called stable cavities, while bubbles that have expansion ratios much greater than 2, and which collapse extremely rapidly, are called transient cavities.

A transient cavity is an amplifier of energy density, in the sense that after expansion in a pressure field of low energy density the collapse of a transient cavity results in an implosion that generates very large energy densities both within the cavity and the surrounding liquid. The mechanism that enables a transient cavity to act as an energy density amplifier is the spherical convergence of the surrounding liquid during collapse At the end of collapse the energy stored in the liquid and in the cavity is converted into energy that drives an intense radiated shock wave. Thus during the implosion there is compression of the cavity contents and the surrounding liquid, and then the radiated shock wave causes the liquid to undergo a second compression. Behind this radiated shock front there will be a "shell" of compression that propagates outwardly. This shell is a region in the host liquid in which pressures and temperatures are high enough to bring about allotropic transformations of Form I within the shell.

The spherical convergence of the liquid surrounding an imploding cavity causes the cavity interface to become unstable in the sense that any small perturbation of the cavity interface will grow. Control of such initial perturbations by methods described hereinafter delays break up of the interface until the energy density has reached a maximum. Then, whether the interface remains spherical or not, the very large kinetic and internal energy densities generated by the imploding cavity will be available for driving the intense shock wave radiated by the collapsed cavity.

For a seed of given initial radius there is a negative time-dependent pressure of magnitude $P_t$, called the pressure threshold for transient cavitation. For negative pressures with magnitudes greater than $P_t$, seeds of that specified size will grow into transient cavities. This critical pressure increases with an increase in the operating (static, ambient) pressure and decreases with an increase in the initial radius of the seed and an increase in the duration of the negative pressure. For a seed of radius $R_n$ there is a negative timedependent pressure of magnitude $P_t$ called the pressure threshold for transient cavitation. For negative pressures with magnitudes greater than $P_t$, seeds of that specified size will grow into transient cavities.

SUMMARY OF THE INVENTION

As described in greater detail hereinafter, the host liquid is contained in the reaction chamber of an allotropic converter, which preferably is a cylindrical enclosure whose walls are resistant to corrosion by the host liquid. The host liquid normally is a liquid metal, such as aluminum, but other liquids (metal or non-metal) may be used. The substance to be transformed from Form I to Form II is dispersed in the host liquid as small particles, or is in contact with the host liquid as a solid surface, or is dissolved in the host liquid. An external acoustic pressure source, comprising a plurality of transducer-operated horns, generates an acoustic or time-varying pressure $p_A$ in the reaction chamber and causes a cycle of negative and positive pressures to occur in the cavitation zone of the liquid.

In the liquid "shell" behind the radiated shock wave of a collapsed cavity, a fragment of Form I of a substance (such as carbon) is transformed into its Form II (such as diamond) provided that the pressure P and temperature T that are created behind the shock front are those of a thermodynamic state lying in the region (S-T) of the substance's pressure-temperature phase diagram where Form I transforms into Form II in an essentially spontaneous manner. In addition, Form II must be stable or metastable in the operating temperature and pressure of the host liquid.

DETAILED DESCRIPTION OF THE PREFERRED EMBODIMENTS

Figure 1:
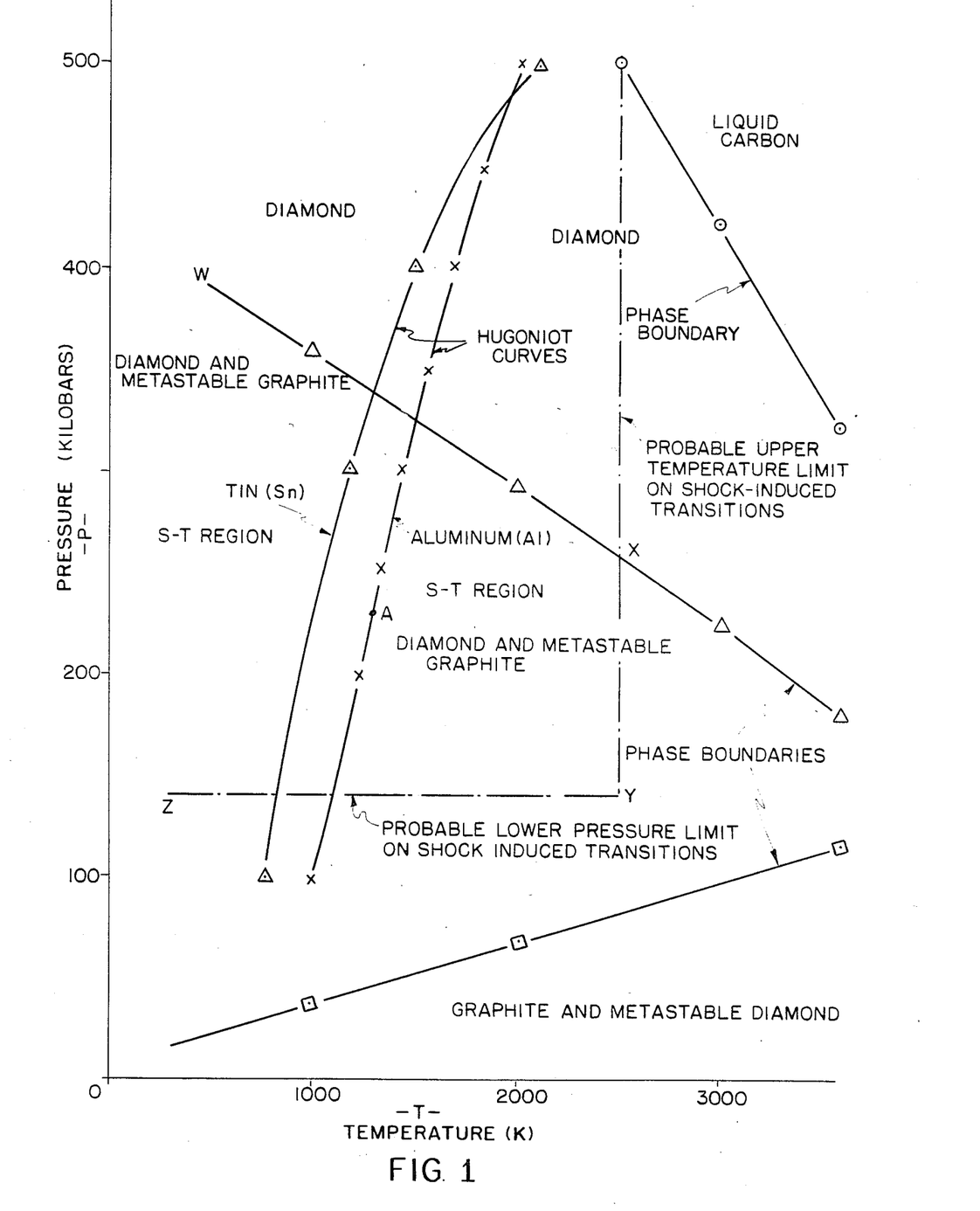
FIG. 1 shows graphically the pressure-temperature phase diagram of carbon and the Hugoniot curves for alumimun and indium.

Referring first to FIG. 1, the illustrated Hugoniot curves for aluminum and tin (and for that matter indium and water, not illustrated) are experimental curves reported by Walsh, Rice, McQueen and Yarger (Physical Review, Vol. 108, pp. 196–216, 1957; by Al'tschuler, Kormer, Bakanova and Trunin (Sov Phys.-JETP, Vol. 11, pp. 573–579, 1960); by McQueen and Marsh (J. App. Phys., Vol. 31, pp. 1253–1269, 1960); and by Rice and Walsh (J. Chem. Phys., Vol. 26, pp. 824–830, 1957). The region in FIG. 1 denoted generally by points W, X, Y and Z, is where spontaneous transitions from carbon (graphite) to diamond can take place and is known as the S-T region, which is referred to above in connection with the teachings of Bundy and others.

In FIG. 1, where the Hugoniot curves for aluminum and tin are superposed on the phase diagram of carbon, the variables P and T are, respectively, the total pressure and temperature for both the host liquid and a carbon particle. A Hugoniot curve relates the pressure P behind a shock wave to the temperature T behind the shock. Thus, a point on the Hugoniot curve of the host liquid describes a state (P,T) behind the shock wave radiated by a collapsed transient cavity. The pressure P is the sum of the operating (static, ambient) pressure $p_L$ and the increase in pressure $p_s$ behind the shock front induced by the collapse compression and the subsequent shock wave. The temperature T is the sum of the operating (static, ambient) temperature $T_L$ and the increase in temperature $T_s$ behind the shock front.

When the radiated shock front envelops a carbon particle in the host liquid, the pressure and temperature in the particle increases to the values of P and T behind the shock. Because a point on the Hugoniot curve is also a point on the carbon phase diagram, the particle will then transform into diamond whenever the point (P,T) lies in the S-T region of the phase diagram.

The hereinafter described allotropic converter (FIG. 2) causes the implosion of a transient cavity in which the maximum pressure $p_m$ at its interface is equal to or greater than that of a point on the Hugoniot curve within the S-T region of the carbon phase diagram. This maximum pressure $p_m$ then becomes the initial strength of the radiated shock whose strength then decreases as $1/r$ as it propagates outward. The variable r is the radial distance from the center of the cavity to the shock front. In FIG. 1, the point labeled "A" on the Hugoniot of aluminum is the initial state determined by the maximum pressure $p_m$ of a collapsed cavity. Calculation of this value of $p_m$ is described in detail hereinafter. As the shock propagates outward, the point moves downward on the Hugoniot.

The operating pressure $p_L$ is of the order of 1–100 bars and is negligible compared with $p_s$. The operating temperature $T_L$ may be of the same order of magnitude as $T_s$ and its specification determines the location of the Hugoniot of the host liquid in the T-S region of the carbon phase diagram. An operating temperature in the range of 100° K. above the melting point of the metal used as the host liquid optimizes the location of the Hugoniot in the T-S region. Such a specification (e.g., 1000° K. for Al and 600° for Sn) also insures that after passage of the shock wave graphite particles changed into diamond will not revert to graphite and that the vapor pressure of the host liquid will remain negligible.

In general, where seeds grow from small particles of graphite dispersed in the host liquid (e.g., Al or Sn), one or more particles of graphite will be enveloped by the expanding liquid shell, compressed by the shock wave and lying between the cavity interface and the shock front. Moreover, the greater the maximum pressure $p_m$ developed at the collapse of a cavity, the greater the number of graphite particles which will be enveloped by the associated shock wave as the latter radiates outwardly. When any such particle lies in a point in the liquid where (P,T) is a state on the Hugoniot curve in the S-T region, (for instance point "A" in FIG. 1) the particle converts into diamond in an essentially spontaneous fashion. In short, whenever the strength of the shock, as it decreases along the associated Hugoniot curve, lies in the S-T region, the particles of graphite enveloped by the shock wave at that point will convert into diamond.

Graphite may be dissolved in the host liquid, when the liquid is a liquid metal. Such dissolved graphite will also be converted into diamond under the same condition as would a solid particle of graphite.

Figure 2:
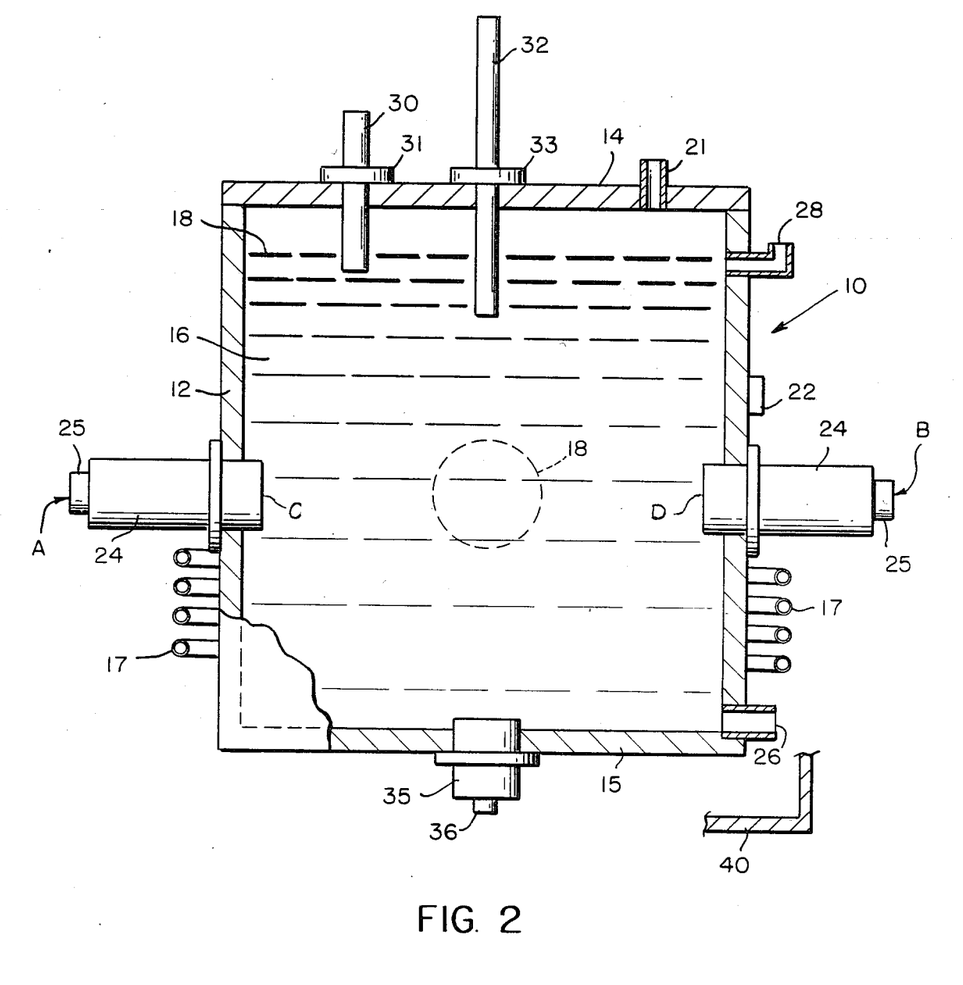
FIG. 2 is a fragmentary side elevational view of an allotropic converter made according to one embodiment of this invention, the level of the host liquid in the converter being shown diagramatically by a broken line.

Referring now to FIG. 2, numeral 10 denotes generally an allotropic converter or reaction chamber the walls of which are made of a metal such as steel or titanium, or a refractory ceramic, and lined with a corrosion resistant material such as alumina or boron nitride. The vertical wall 12 of the chamber is cylindrical in configuration, and is closed at its upper end by a flat, circular cover plate 14, and at its bottom by a similar plate 15. In the illustrated embodiment the host liquid 16 is aluminum, which is maintained at an operating temperature of approximately 1000 K. by external heating coils which are denoted schematically and fragmentarily at 17. The depth of the liquid is such that the cavitation zone 18 lies centrally of the midpoint of the liquid.

The chamber 10 is initially charged with aluminum that is free of any included impurities and coatings. Graphite powder made from high density graphite, and which may have been exposed to an inert gas such as argon, is then added to the liquid. The chamber is then closed by the top cover 14, and the inner walls of the chamber and its contents are degassed under a vacuum via the inlet duct or port 21 in cover 14. An inert gas, such as argon, is then admitted through the same inlet port 21; and the mixture of aluminum and graphite is heated by coils 17 to the operating temperature.

A second degassing then rids the host liquid of gas bubbles greater than about 1 micron in radius. This degassing is done under a vacuum and is assisted by the application of a low intensity, low frequency acoustic field applied to the host liquid by a transducer 22 attached to the wall 12 of the chamber. Once the degassing is complete, argon is readmitted to the chamber through the inlet 21 at a pressure which controls the operating pressure $p_L$ in the host liquid.

An array of acoustic horns 24 in the form of solid titanium cylinders project through the vertical wall 12 of the chamber in such a fashion that their axes are disposed horizontally in a common plane to intersect in the cavitation zone 18 at the vertical axis of the chamber. Each horn transmits acoustic energy provided by a transducer 25 either affixed to the outer end of each horn, as shown in FIG. 2, or sandwiched between two horn cylinders. The array of horns and associated transducers consists of a plurality angularly spaced pairs of opposing horns 24 of which only one pair is shown in FIG. 2. The number of such pairs is not critical, but a reasonable choice would lie between two and eight. The transducing element may be a piezoelectric or a piezomagnetic element that converts an electrical pulse into a pressure pulse.

Because the host liquid is aluminum, particles of graphite tend to rise to the upper surface of the liquid, and particles of diamond tend to sink to the bottom of the chamber 10. Diamond-rich aluminum is removed through an outlet duct or port 26 adjacent the bottom of the reaction chamber; and graphite-rich aluminum is removed through an outlet duct 28 located adjacent the upper end of the chamber. Additional aluminum is added by lowering an aluminum rod 30 through a gas-tight gland 31, which is formed in cover 14.

The distribution of graphite particles is replenished by a graphite rod 32, which extends into the reaction chamber through the cover 14. The rod 32, whose diameter is small compared to that of the cavitation zone, is held in position by a gas-tight gland 33, which permits the rod to be raised or lowered. In order to replenish the distribution of graphite particles in the cavitation zone the rod is lowered so that its lower end is in the cavitation zone 18. Erosion of the rod by cavitation generated by the applied pressure field then re-seeds the host liquid with graphite particles ejected from the surface of the rod. The graphite is previously saturated with argon so that the erosion also replenishes the distribution of argon seeds in the liquid.

Mounted centrally in the bottom wall 15 of chamber 10 is another horn 35 that is driven by a transducer 36. As noted in greater detail hereinafter, transducer 36 is used to reduce the effect of the earth's gravitational field on collapsing bubbles or cavities located in the cavitation zone 18 of the host liquid, thereby delaying the growth of any perturbations in the cavity interface.

In use, assuming the host liquid 16 has been seeded and brought to the proper temperature and pressure, the transducers 25 are driven in known manner by an external source of power, and create a pressure in the reaction chamber 10 that is a function of time and position. This acoustic pressure $p_A$ consists of a repetitive cycle consisting of a negative pressure followed by a positive pressure, superposed on the static operating pressure $p_L$. While the positive pressure may be simply the operating pressure $p_L$, the applied acoustic pressure $p_A$ is in general a cycle of negative and positive pressures, which may be a sinusoidal function of time or a series of pulses; and the amplitude of the positive pressure may differ from that of the negative pressure. The geometry of the acoustic pressure field $p_A$ determines the cavitation zone in the reaction chamber; and the acoustic pressure preferably is kept at a minimum at the chamber walls, and at a maximum in the cavitation zone 18, so that cavitation events are suppressed everywhere but in the cavitation zone.

The acoustic pressure field $p_A$ may be generated in the reaction chamber 10 by employing a high-loss (or low-Q) system in which the applied pressure field is generated by the horns 24 that are directly in contact with the host liquid (in such a system the pressure cycle usually consists of a negative pulse followed after a time interval by a positive pulse), or a low-loss (or high-Q) system in which a symmetrical standing wave is established in the reaction chamber by transducers external to the reaction chamber (in such a system the pressure cycle is usually a sinusoidal function of time). In a low-Q system distortion of the cavity interface arising from the applied pressure $p_A$ is minimized by the use of a cycle consisting of a negative pressure pulse followed after an interval by a positive pressure pulse. In each cycle the applied pressure $p_A$ falls to some minimum and then rises back to zero. The applied pressure then remains zero during a time interval during which the seed continues to grow until it reaches a maximum radius $R_o$. When the width of the negative pulse is short compared with this time interval of zero pressure, the expansion of the cavity to maximum size takes place in a cavitation zone essentially free of pressure gradients that tend to deform the cavity.

Any distortion arising from action of the negative pulse on a seed is minimized by keeping the seed at least on an order of magnitude less than the spatial extent of the pulse. Degassing the host liquid as described above eliminates all seeds with radii greater than a few microns and seeds even smaller result from cavitation events. This size distribution for seeds insures that this condition is met for all pulse widths used in this invention.

In a high-Q system, only a small input of energy is supplied by the external transducer per cycle. When a cavitation event occurs, this resonance condition is destroyed momentarily and the cavity collapses under the positive operating pressure $p_L$ in the chamber. The resonance condition is then re-established and the pressure cycle repeated. Reference is made here to my copending application Ser. No. 907,737, for a more detailed description of this mode of operation.

The operation of a pair of opposed horns 24, such as those associated with the two transducers denoted at A and B in FIG. 2, is as follows: transducers A and B emit identical negative pulses at the same instant. These pulses superpose constructively at the center of the cavitation zone 18. The pulse from A is then reflected at D as a negative pulse of reduced amplitude, and the pulse originating from B is reflected from C in a similar fashion. The reduction of amplitude on reflection would be about 6%. The two transducers emit a second set of negative pulses in synchronism with the pair of reflected pulses so that the resultant amplitudes are equal to those of the first set. The second set of pulses will reach the center of the cavitation zone 18 in a time interval $T_r$ after the first set of pulses arrives there.

The interval $T_r$ between the superposition of negative pulses in the center of the cavitation zone is such that a transient cavity induced by the first set grows to a maximum and collapses before arrival of the second set. By this use of a sequence of negative pulses, separated by a time interval $T_r$, the applied pressure $p_A$ is zero during most of the growth phase of a transient cavity and the pressure gradients associated with $p_A$ are minimized during that interval.

When the host liquid is free of seeds of radii greater than about one micron, the threshold for growth of a transient cavity in the cavitation zone is approximately 6 bars. Consequently, when $p_L$ equals 1 bar, an array of transducers consisting of two pairs of transducers produce a net negative pressure of $-19$ bars in the cavitation zone even when each transducer radiates a pulse of only $-5$ bars. Hence transient cavities are produced only in the cavitation zone by negative pressure pulses whose amplitudes individually need only be 5 bars or even less. The resultant pressure in the cavitation zone is $-9$ when the pulses of amplitude $-2.5$ bars superpose there.

Calculations made for the growth of a transient cavity from a seed of $R_n = 10^{-4}$ cm. under a resultant pressure of $-19$ bars in the cavitation zone show that, for a pulse width of 1 microsecond, the pressure of any one pulse reaches $-5$ bars at the end of 0.64 microsecond and rises to $-0.25$ bars at the end of 1.5 microseconds. The cavity reaches it maximum radius of 45.6 $R_n$ at the end of 6.6 microseconds and collapses to its minimum radius at the end of 12.3 microseconds. The result is that during 75% of the expansion phase of the cavity the applied pressure is zero, and the growth of the expansion takes place in a host liquid free of distorting pressure gradients. In the described mode of operation, the interval $T_r$ between superposition of pulses is equal to $d/a_n$ where d is the diameter of the chamber and $a_n$ is the speed of sound in the host liquid. When d = 20 cm. and $a_n = 4.666 \times 10^5$ cm. sec$^{-1}$, $T_r = 43$ microseconds, and hence the cycle of growth and collapse of the cavity is completed 30.7 microseconds before the second set of pulses arrives in the cavitation zone. The repetition rate $f_r = 1/T_r$ for the occurrence of cavitation events is 23.3 kHz in this example.

Each of the titanium horns 24 that radiate pressure pulses into the host liquid has a diameter of 3 cm. The radiating face of each horn projects a beam pattern and the interaction of such beams at the midpoint of the host liquid defines the volume of the cavitation zone. For a specified pulse width of 1 microsecond, each beam has a pattern in which the pressure drops to 0.1 of its axial value at a distance of 1.3 cm. from the midpoint of a plane passing through the midpoint and normal to the axis of the beam.

Reduction of the earth's gravitational field in the cavitation zone is brought about by an imposed vertical acceleration caused by a vertical standing pressure wave excited by the transducer 36 in the bottom wall of the chamber. This vertical standing wave appears when a stationary vibrational mode of low amplitude is generated by exciting the liquid at the same frequency as the pulse repetition rate, $f_r$. When the depth h of the host liquid is maintained at a value determined by:

$$h = a_n/f_r$$

then the pressure distribution of the stationary mode is such that the pressure of the mode is a minimum at the center of the cavitation zone, located at a distance h/2 from the surface of the liquid, and the vertical acceleration at that midpoint is a maximum. The pressure and particle acceleration are then uniform in any plane perpendicular to the vertical axis of the chamber.

When such a mode is established the pressure amplitude $P_g$ of the vertical standing wave required to reduce or cancel the earth's gravitational field in the cavitation zone is given by $$P_g = (h/2\pi)\rho_o g$$

where $\rho_o$ is the density of liquid and g is the acceleration due to gravity. In the operation described here, $P_g = 7.39 \times 10^{-3}$ bars for a value of h=20 cm. and $f_r = 23.3$ kHz.

The pressure amplitude of the stationary mode required to reduce the earth's gravitational field in the cavitation zone is thus very small compared with the applied pressure $p_A$ used in generating a transient cavity from a seed. However, the applied pressure is zero in that part of the cavity motion in which the imposed acceleration is needed to cancel the earth's gravitational field. The time phase of the imposed vertical acceleration is adjusted so that the acceleration is downward during most of the expansion and part of the collapse of the transient cavity. In the example described here, the radius of the transient cavity lies between 0.5 $R_o$ and $R_o$ for 85% of its lifetime the synchronization of the cavity motion and the applied acceleration needs only to be approximate The cancellation of the earth's magnetic field is achieved by enclosing the entire chamber in a magnetic shield which is shown fragmentarily at 40 in FIG. 2, and which is similar to that described in my said copending application Ser. No. 970,737.

The following calculations show that, when properly controlled, imploding transient cavities generate pressures and temperatures in the host liquid 18 high enough to being about allotropic transformation of graphite to diamond. In each example considered, they demonstrate that the initial strengths of the radiated shocks lie on the Hugoniot of aluminum in or above the S-T region of FIG. 1.

The calculations have been carried out on a digital computer using the mathematical formulation for cavitation dynamics derived by the applicant and described previously to compute the growth and collapse of a transient cavity under the influence of a short negative pulse as well as the pressure, p, occurring in the liquid at the interface of the cavity, and the speed U of the interface.

Physical processes that affect the maximum pressure achieved in a spherically symmetrical collapse include the compressibility and viscosity of the liquid, the surface tension of the interface, heat transfer between the liquid and the cavity and the nature of the cavity contents. The effects of both viscosity and surface tension on the maximum pressure are negligible for transient cavities. Heat conduction tends to increase the maximum pressure reached in collapse and hence the collapse pressure is maximized when heat transfer is a maximum. In these calculations it is assumed that heat transfer effectively ceases during the final stage of collapse and the cavity contents are then compressed adiabatically. This assumption obviously underestimates the final pressure.

Compressibility has the greatest effect in moderating the violence of the implosion. In these calculations it is assumed that in the final stage of the implosion the liquid is governed by a non-linear equation of state established by shock wave experiments that were made at strengths up into the megabar region. The host liquid was assumed to be aluminum because this material has been studied most extensively in the megabar region. The equation of state used was based on the data reported by L. V. Al'tshuler, S. B. Kormer, A. A. Bakanova and R. F. Trunin (Soviet Physics; JETP Vol. 11, pp. 573–579, 1960) and J. M. Walsh, M. H. Rice, R. G. McQueen and F. L. Yarger (Phys. Rev. Vol. 108, pp 196–216, 1957).

Because the vapor pressure of liquid aluminum is negligible, it was assumed that the cavity contained only argon. An equation of state for argon at high pressure and temperatures was constructed using data published by J. Hilsenrath, C. G. Messina and M. Klein, of the National Bureau of Standards(Report AEDC-TR-66-248, 1966) and by W. Geiger, H. Hornberg and K. H. Schramm (Springer Tracts in Modern Physics Vol. 46, Springer-Verlag, Heidelberg, 1968).

Three sets of calculations that were made deal with the growth and collapse of a transient cavity whose initial radius $R_n = 10^{-4}$ cm. The liquid is aluminum at 1000 K and the cavity is filled with argon. The applied pressure $p_A$ is a Gaussian pressure pulse of amplitude $p_A$ and a temporal width of 1 microsecond. The following table summarizes the results for a spherically symmetrical motion ($p_L$ equals 1 bar):

time taken for the cavity to reach $R_o$, $p_m$ is the maximum pressure reached in a spherical collapse and $U_m/a_n$ is the ratio of the maximum collapse speed to the equilibrium speed of sound in the liquid. The maximum pressure $p_m$ is plotted as point A on the Hugoniot for Al in FIG. 1. for $p_A$ equal 7.5 bars.

In a spherical implosion, the maximum pressure reached is a function of the maximum collapse speed $U_m$ and hence of the maximum kinetic energy density in the liquid at the interface. Whether the interface breaks-up or not, this kinetic energy is converted into the internal energy of the host liquid that drives the intense shock wave radiated by the collapsed cavity. For a given maximum collapse speed, this shock strength is approximately equal to the maximum pressure determined by that collapse speed in a spherical collapse.

Any perturbation initially present on the interface of a cavity at its maximum radius $R_o$ will grow during collapse of the cavity. Such growth of an initial perturbation could cause break-up before the cavity speed reaches the maximum that it would otherwise obtain. When the deformation of a cavity caused by gravity is symmetrical about a vertical axis through its center, the interface can be described by an infinite series of Legendre polynomials, $P_j(\theta)$. Thus:

$$R(\theta, t)/R(t) = 1 + \sum_{j=2}^{\alpha} [r_j(t)/R(t)]P_j(\theta)$$

where $R(t)$ is the average, time-dependent radius of the cavity, $r_j(t)$ is the jth time-dependent perturbation amplitude and $\theta$ is the angle that the radius, $R(\theta,t)$, makes with the vertical axis. The ratio, $r_j/R$, is the relative perturbation amplitude and a term, $r_jP_j/R$, is called the jth mode.

Calculations were made to determine the initial perturbation so small that the collapse speed would reach the value $U_m$ of spherical collapse before the interface breaks up. These calculations were carried out by numerical solution of a differential equation for the perturbation amplitude, $r_j(t)$, given by M. S. Plesset and A. Prosperetti (Ann. Rev. Fluid Mech. Vol. 9, p. 177, 1977). Calcuation of the growth of a single mode gives an upper estimate on the effect of a perturbation caused by gravity. In these calculations, the selected mode was the mode, $r_3P_3/R$, of order three because it is a rough approximation to perturbations caused by gravity. The appearance of higher order modes would cause $r_3$ to grow more slowly.

In the calculations, breakup was defined as the occurrence of a relative perturbation, $r_3/R$, equal to $\pm 1$ on the vertical axis through the center of the cavity. Calcuations made for implosions brought about by each of the three pressure amplitudes show that when the initial perturbation is of the order of 0.1 to 0.7 microns ($10^{-4}$ cm.), break up is deferred until $U = U_m$. Thus when $P_A=7.5$ bars an initial deformation of 0.13 microns causes breakup only when $R/R_n = 0.93$ where $U = -0.33a_n$ and hence the strength of the radiated shock will be approximately $2.2 \times 10^5$ bars.

| $p_A$ (bars) | $R_o/R_n$ | $R_o$ (cm) | $t_o$ (sec) | $p_m$ (bars) | $U_m/a_n$ |
|---|---|---|---|---|---|
| 7.5 | 9.33 | $9.33 \times 10^{-4}$ | $1.9 \times 10^{-6}$ | $2.24 \times 10^5$ | $-3.30 \times 10^{-1}$ |
| 10 | 17.26 | $1.73 \times 10^{-3}$ | $2.9 \times 10^{-6}$ | $9.66 \times 10^5$ | $-7.32 \times 10^{-1}$ |
| 20 | 45.58 | $4.56 \times 10^{-3}$ | $6.6 \times 10^{-6}$ | $5.66 \times 10^6$ | $-2.04$ | where $p_A$ is the pressure amplitude of the pulse, $R_o/R_n$ is the expansion ratio, $R_o$ is the maximum radius, $t_o$ is the The maximum deformation caused by gravity during expansion can be estimated from the formula $gt_0^2/2$. This amplitude varies from $1.9\times10^{-6}$ cm. to $6.6\times10^{-6}$ cm. for the three examples cited here. Reduction of the earth's field in the cavitation zone by means described here would then make deformation by gravity negligible.

A general conclusion then is that, when the initial perturbation is less than 10% of the maximum radius of a transient cavity, the strength of the radiated shock will approximate that predicted for a spherical implosion.

From the foregoing, it will be apparent that the present invention provides a novel process and apparatus for the allotropic conversion of a substance by the application of acoustical energy to a host liquid containing, or in contact with, the substance. Preferably the host liquid in which cavitation takes place is a liquid metal, such as e.g., aluminum, indium, tin or gallium. Liquid metals such as indium and tin have low melting points, extraordinarily low vapor pressures and high surface tension coefficients, whereby most gases have low solubilities in them. Their structures are simple, and chemical reactions that might occur in more complicated liquids are avoided.

Metals suitable for use as host liquids fall into two classes: either the density of the liquid is greater than those of Form I and Form II of the substance being transformed, in which case both forms tend to move to the surface of the liquid; or the density of the host liquid is greater than that of Form I but less than that of Form II, in which case Form I tends to move to the upper surface while Form II tends to sink. When Form I is graphite, tin is an example of the former class and aluminum is an example of the latter class. Thus when the host liquid is tin its upper surface tends to become diamond-rich, and diamond particles would be drawn off at the outlet 28. However, when the host liquid is aluminum its lower surface tends to become diamondrich, in which case the diamond-rich aluminum would be drawn off at the lower outlet 26 as noted above.

Non-metallic substances used as host liquids make recovery of Form II simpler than that from liquid metals. An example of such a substance is di-butyl sebacate whose vapor pressure is very low at room temperature. After a particle of graphite has been converted into diamond by passage of the shock front it must be cooled quickly to a temperature below that at which graphitization of diamond could take place. The use of a liquid metal as a cooling medium indicates that metals with lower melting points, such as indium, gallium and tin, would be preferred as host liquids. These metals and aluminum have thermal diffusivities two orders of magnitude greater than that of water.

As noted above, an allotropic transition between two stable phases of a substance occurs only when a Form I substance is in a thermodynamic state lying in the S-T region of the P-T phase diagram of the substance concerned. In general, therefore, the operating temperature of the reaction chamber must be high enough so that it does not prevent the shock from reaching states lying in the S-T region, and low enough so that it does not destroy Form II (diamond) after it has been formed. That is, the operating temperature should be such that graphitization of diamond will be minimal (D. G. Morris, J. Appl. Physics Vol. 51, pp 2059–2065, 1980). At 1 bar, graphitization of diamond starts at temperatures on the order of 1700–2200 K. (Bovenkerk, Hall, Strong and Wentorf, Nature Vol. 184, p. 1094, 1959). When aluminum is specified as the host liquid, an operating temperature of 1000 K lies well below that region; while the use of indium or tin as a host liquid requires operating temperatures on the order of 500–600 K, thus moving the temperature even further away from the critical range in which graphitization of diamond occurs.

Also as noted above, the distribution of graphite or other Form I substances in the host liquid may be in the form of particles dispersed in the liquid, or a solid body with a surface in contact with the host liquid, or may be dissolved in the host liquid. When Form I is a body of graphite and the host liquid is a metal, the graphite is positioned in the cavitation zone so that cavitation events occur mainly on or near a surface of the body, thereby causing small particles to be ejected into the host liquid, or to be transformed directly into Form II. When present as a solid, the process is assisted when graphite is of high density, low porosity, wetted by the host liquid, and freed of all gas content. When graphite is distributed in the form of particles, the yield of diamond is improved as the average size of the particles increases, but an upper limit on particle size is placed on the requirement that presence of the particle does not cause a transient cavity to deform. Particles with the largest linear dimension in the range of 10 to 100 microns meet this requirement, although particles lying outside this range may be transformed into diamond by this invention. The necessity of cooling a particle after its conversion into diamond also places an upper limit on the size of particles that are being used. A small particle in a liquid cools off faster than a larger particle.

For seeding, an inert gas such as helium or argon is preferred because it is almost insoluble in any liquid metal that might be used as a host liquid, and a small bubble of such gas would therefore persist in the host liquid unless it floated to the surface and disappeared. Seeds with radii greater than a few microns will rise to the surface, but smaller seeds will move in a random manner under the influence of Brownian forces. The larger seeds (radii greater than a few microns) will be removed by degassing the host liquid under a vacuum. Removal of these larger seeds is assisted by the application of an ultrasonic pressure field with an amplitude of a few bars and at a frequency of 20–60 kHZ.

Once the large seeds have been removed, seeds with radii less than about a micron will persist in the caviation zone. In the distribution of particles of Form I in the host liquid, such as graphite particles, there will be some particles on which small seeds of an inert gas will be stabilized in cracks, if the particles are exposed to an inert gas atmosphere before being introduced into the host liquid. Particles carrying such seeds can also be distributed in the host liquid by degassing porous graphite rods and then exposing them to an inert gas atmosphere. When the rods are lowered into the cavitatioh zone, small particles will be ejected by cavitation events on or near the rod. These seeds on particles will serve as sites on which generation of transient cavities will initially start.

Transient cavities formed from seeds of an inert gas in any metal used as a host liquid will contain an amount of gas that remains fixed throughout the expansion and implosion, and a negligible amount of vapor. Because the interface of the collapsing cavity is unstable, many such cavities will break-up on collapse. Each cavity that breaks up in this fashion will create several new seeds less in size than the initial seed. As a result, once generation of transient cavities has started, there is a proliferation of small seeds. These new seeds that become sites for new cavition events contain only a fraction of the gas content of the initial seed and will persist almost indefinitely. The generation of new seeds with a reduced gas content insures that transient cavities created from them will collapse with great violence.

The static (operating) pressure $p_L$ in the allotropic converter 10 is the pressure that exists in the host liquid 16 independently of a time-varying pressure $p_A$ that is generated by the transducers 25. The total pressure in the cavitation zone 18 of the host liquid is the sum of $p_L$ and $p_A$. There are several ways in which this parameter may be used to control the operation of the allotropic converter; and reference is made to my above-noted copending patent application Ser. No. 907,737 for a more detailed description of hcw this parameter may be used to produce the desired cavitation effect.

The static pressure affords an alternative way in which to apply a positive pressure of specified amplitude to a cavity that has reached a maximum radius $R_O$ and starts to collapse.

During an implosion the interface of a collapsing cavity is unstable, in the sense that any small perturbation of the surface at its maximum radius $R_O$ tends to grow as R decreases. These undesirable perturbations or deformations of a cavity are caused by unsymmetrical forces acting on a transient cavity. Such forces are usually those that arise from the gravitational and magnetic fields of the earth, the proximity of surfaces such as the wall of the reaction chamber, unsymmetrical gradients in the applied pressure field, and interactions with other nearby cavities. Location of the cavitation zone far from surfaces, reduction of the number of cavitation events per pressure cycle, and the design of the applied pressure field to eliminate unsymmetrical gradients, minimize the effects of all such forces except those arising from gravitational and magnetic forces.

In this invention, therefore, it is desirable that reduced or zero gravitational and magnetic forces exist in the cavitation zone 18, so that the growth of any initial perturbation is delayed until after the energy density in the surrounding liquid and in the cavity reaches a maximum. The implosion will then generate an energy density equal to the maximum that would occur in a completely spherical motion.

In the embodiment shown in FIG. 2, enclosure 40 shields the cavitation zone from the earth's magnetic forces, while the zero gravitational environment is achieved by the horn 35 and its transducer 36. However, as noted in my copending application Ser. No. 907,737, the earth's magnetic field may be cancelled in other ways, such as by the use of permanent magnets or Helmholtz coils that create a magnetic field equal and opposite in sign to the vertical and horizontal components of the earth's magnetic field as it exists in the reaction chamber 10. Reduction of the gravitational field may also be achieved by imposition of an acceleration of appropriate magnitude and direction in the liquid in the cavitation zone. A vertical acceleration is applied so that it is directed downwardly during most of the expansion and part of the compression phases of the cavity (J. C. Allred and G. B. Blunt, Report LA-1600, Los Alamos Scientific Laboratory, 1953). Its magnitude is equal to that caused by gravity. The vertical pressure gradient caused by gravity, which increases with depth, is then cancelled in the cavitation zone by the pressure gradient associated with the imposed acceleration, which increases upwardly. The cavity is then essentially in "free fall" when this cancellation occurs. Still another alternative is to operate the device in an orbiting space vehicle or in a space vehicle far from any large mass.

The force of gravity acts as a pressure tending to deform the cavity interface while surface tension at the interface tends to resist such deformation. In liquid metals the surface tension coefficient is large and the pressure generated by surface tension increases as the radius of the cavity decreases. In the small cavities generated in this device the force of surface tension tending to maintain a spherical shape is always large compared with the force of gravity tending to distort the interface. Hence a distribution of small seeds helps maintain the stability of transient cavities.

The invention may also be used to cause substances other than carbon to undergo an allotropic change from a "soft" form (Form I) to a "hard" form (Form II). One such substance is boron nitride (BN) whose Form I is a white soft material and whose Form II is hard enough to scratch diamond. The phase diagram of BN closely resembles that of carbon shown in FIG. 1 (F. P. Bundy and J. S. Kasper, J. Chem. Phys. Vol. 46, p. 3445, 1967). Transformation of BN from Form I to Form II has been induced by shock waves with strengths greater than about 120 kilobars (P. S. DeCarli, Bulletin Am. Phys. Soc., Series II, Vol. 12, p. 1127, 1967, and G. A. Adadurov et al., Soviet Physics-Doklady Vol. 12, p. 173, 1967). The upper limit on the operating temperature for this transformation is approximately 2000° K. above which Form II reverts to Form I after passage of the shock. The similarity of the transformation of BN to the graphite-diamond transition results in the same specification of the operating pressure (1–100 bars) and the operating temperature (within about 100 K. of the melting point of the metal used as the host liquid). The Hugoniot of the metal used as the host liquid will then lie in the region of the BN phase diagram where essentially spontaneous transformation of Form I to Form II will take place, and the resulting particles of Form II will either be stable or metastable at the operating temperature.

While this invention has been described as being particularly suited for use in connection with only one embodiment thereof, it will be apparent that it is capable of still further modification, and that this application is intended to cover any such modification as may fall within the scope of one skilled in the art or the appended claims.

Having thus described my invention, what I claim is:

1. A method of effecting the allotropic transformation of a nongaseous substance from a first form thereof to a second form by the phenomenon of cavitation, comprising placing in a sealed chamber a host liquid which contains a plurality of small bubbles of an inert gas, applying a time-varying acoustical pressure to said liquid to create therein a cavitation zone in which at least certain of said small bubbles of gas expand and then collapse violently to form shock waves which radiate outwardly from the centers of the collapsed bubbles, placing said substance in said first form thereof in said cavitation zone for exposure to said shock waves, and maintaining said substance and said liquid at an ambient temperature and static pressure sufficient to effect substantial spontaneous transformation of said substance into its second form by action of the said shock waves.

2. A method as defined in claim 1, wherein applying acoustical pressure to said liquid comprises alternately applying negative pressure to said liquid to cause said certain bubbles to expand, and positive pressure to cause the last-named bubbles to collapse.

3. A method as defined in claim 1 wherein the host liquid is rid of all gas seeds with radii larger than about 1 micron by reducing the pressure at the surface of the liquid to a partial vacuum while applying an acoustic pressure, supplied by an auxiliary transducer in the wall of the chamber, with an amplitude of a few bars and a frequency far below the linear resonance frequency of 1-micron gas seeds (for example, 20 to 60 kHz).

4. A method as defined in claim 2 wherein the negative pressure applied to the host liquid has a magnitude larger than that of the threshold pressure ($P_t$) for gas seeds with radii ($R_n$) of 1 micron or smaller.

5. A method as defined in claim 2, including the step of reducing the effect of the force of gravity on said bubbles to approximately zero in said cavitation zone.

6. A method as defined in claim 5, wherein vertical acceleration is imparted to said host liquid to reduce the effect of gravity in said zone.

7. A method as defined in claim 5, wherein a standing pressure wave is generated in said liquid to reduce the effect of gravity in said zone.

8. A method as defined in claim 2, wherein a magnetic field is imposed on said host liquid to reduce the effect of earth's magnetic field in said zone.

9. A method as defined in claim 5, wherein said chamber is placed in the reduced gravitational environment of a space vehicle to reduce the effect of gravity in said zone.

10. A method as defined in claim 1, wherein said ambient temperature and static pressure are determined at least in part by a comparison of the phase diagram of said substance with the Hugoniot curve of the host liquid.

11. A method as in claim 10 wherein in reference to FIG. 1 of the drawing herein, the static pressure ($P_L$) and ambient temperature ($T_L$) values are maintained in the host liquid such that the pair of values ($P_L$, $T_L$) is the initial state of a Hugoniot of the host liquid passing through the ST region of the p-T phase diagram (FIG. 1) of said substance, and said pair ($P_L, T_L$) is also a final state after passage of a shock wave in which the second form is stable against transformation back into its first form, a suitable pair for graphite being $P_L = 1$ bar and $T_L = 1000$ K. in liquid aluminum.

12. A method as defined in claim 1, wherein the substance being transformed is the element carbon, which in its first form is graphite and in its second form is diamond.

13. A method as defined in claim 1, wherein the substance being transformed is selected from the group consisting of boron nitride and zinc sulphide.

14. A method as defined in claim 1, wherein the host liquid is a liquid metal.

15. A method as defined in claim 14, wherein the liquid metal is selected from the group consisting of aluminum, tin, gallium, thallium and indium, and alloys thereof.

16. A method as defined in claim 1, wherein the temperature of said host liquid is maintained above its melting point, but in a range of temperatures where the vapor pressure of the said liquid is negligible compared with the initial gas pressure in the said bubbles.

17. A method as defined in claim 1, including feeding an inert gas under pressure to said chamber to maintain said static pressure on the upper surface of said host liquid.

18. A method as defined in claim 1, wherein in its first form said substance is dispersed in the host liquid as particles having a predetermined average size.

19. A method as defined in claim 18 wherein the average size of said particles lies in a range of $10^{-4}$ to $10^{-1}$ cm. for the largest linear dimension of a respective particle.

20. A method as defined in claim 18, wherein said small bubbles are distributed in the host liquid in or on the surfaces of said particles of said substance.

21. A method as defined in claim 1, including
initially degassing the chamber and the material used as the host liquid by applying a vacuum to the chamber, and
raising the operating temperature of the chamber above the melting point of the host liquid, while maintaining an atmosphere of inert gas in the chamber, thereby to seed inert gas bubbles in said liquid.

22. A method as defined in claim 21, including subjecting said chamber and the material therein to a second degassing operation to rid the host liquid of the gas bubbles greater than approximately 1 micron in radius, said second degassing operation including the application of a low intensity, low frequency acoustic field to the host liquid, while maintaining the liquid under a vacuum.

23. A method as defined in claim 3, wherein after the host liquid has been rid of all gas seeds with radii larger than about 1 micron, applying to the liquid an acoustic pressure of amplitude equal to or larger than the magnitude of the threshold pressure ($P_t$) of the liquid for 1-micron seeds, thereby producing transient cavities whose implosions create new and smaller gas seeds with radii less than 1 micron.

24. A method as defined in claim 1, including supporting a rod of said substance in the chamber to extend at one end into the cavitation zone, whereby erosion by cavitation causes particles of said subtance in said first form to be dispersed into the host liquid.

25. A method as defined in claim 1, wherein the substance in its first form is in solution in the host liquid.

26. A method as defined in claim 1, wherein the host liquid in the chamber is replenished through an inlet in the chamber, whereby the upper surface of the host liquid is maintained at a specified level.

27. A method as defined in claim 1, wherein the step of applying said acoustical pressure comprises cyclically decreasing and increasing the pressure in the said chamber alternately below and above, respectively, said static pressure, the parameters of the pressure cycle being the period of the cycle, the amplitudes and duration of the negative and positive pressures of the cycle, and the interval between the negative and positive phases of the cycle.

28. A method such as defined in claim 27, wherein the interval between the maximum negative pressure and the maximum positive pressure is such that the time-varying pressure acting on an expanding bubble is essentially zero during most of the expansion of the bubble.

29. A method as defined in claim 27, wherein a cycle of negative and positive pressures is maintained in the cavitation zone by a plurality of solid acoustical horns extending into the host liquid.

30. A method as defined in claim 29, including using N pairs of opposing acoustical horns extending into the liquid to generate 2N trains of negative pressure pulses of duration T and amplitude some fraction of the threshold pressure ($P_t$) in the liquid for seeds with radii ($R_n$), the said pulses superposing at the center of the chamber to create a total negative pressure of magnitude larger than that of the threshold pressure ($P_t$), N being an integer greater than 1.

31. A method as defined in claim 30 wherein the interval ($T_r$) between superposition of pulses in the center of the chamber is $d/a_n$ where d is the diameter of the chamber and $a_n$ is the speed of sound in the liquid.

32. A method as defined in claim 30 wherein the duration $T_d$ of each pulse is an order of magnitude less than $T_r$, the interval between superposition of pulses at the center of the reaction chamber.

33. A method as defined in claim 29 including applying in liquid aluminum with $P_L = 1$ bar and $T_L = 1000$ K., four pulse trains from two pairs of opposing solid acoustical horns, the duration of each pulse being 1 microsecond and the amplitude being $-3$ bars ($P_t = -6$ bars), said pulses superposing in the center of the reaction chamber of diameter d $=20$ cm, the interval between superposition of pulses in the center of the chamber being $T_r = 43$ microseconds, and the total negative pressure in the center being $-12$ bars.

34. A method as defined in claim 27, wherein a cycle of negative and positive pressures is maintained in the cavitation zone by excitation of a standing wave mode in the host liquid.

35. A method as defined in claim 1, wherein ambient temperature is maintained in the vicinity of 100° K. above the melting point of the host liquid.

36. A method as defined in claim 1, wherein said static pressure is on the order of 1 to 100 bars.

37. Apparatus for effecting the allotropic transformation of a nongaseous substance from a first form thereof to a second form by the phenomenon of cavitation, comprising means defining a sealed chamber containing a host liquid which has therein a plurality of small bubbles of an inert gas, means for supplying said substance in said first form thereof to a cavitation zone in said host liquid, means for applying a time-varying acoustical pressure to said liquid to cause at least certain of said small bubbles in said cavitation zone to expand and then to collapse, means for inhibiting the deformation of the interface of a bubble during the expansion and collapse thereof, whereby said bubbles are caused to collapse violently to form shock waves which radiate outwardly in the liquid from the centers of the collapsed bubbles, and means for maintaining said liquid and said substance therein at an ambient temperature and static pressure sufficient to effect substantial spontaneous transformation of said substance into its second form by action of said shock waves.

* * * * *